United States Patent [19]

Johnson

[11] 4,175,764
[45] Nov. 27, 1979

[54] MOTORCYCLE WHEEL SUSPENSION DEVICE

[76] Inventor: Roger P. Johnson, 2977 Coker Butte Rd., Medford, Oreg. 97501

[21] Appl. No.: 893,959

[22] Filed: Apr. 6, 1978

[51] Int. Cl.² ............................................. B62K 25/20
[52] U.S. Cl. ..................................... 280/284; 267/173
[58] Field of Search ........................ 280/284, 275, 283; 180/32, 35; 267/16, 173

[56] References Cited

U.S. PATENT DOCUMENTS

| 1,331,747 | 2/1920 | Fisker | 280/284 X |
| 2,143,329 | 1/1939 | Möhl | 280/284 UX |
| 3,948,543 | 4/1976 | MacDonald et al. | 280/284 |
| 3,977,697 | 8/1976 | MacPike et al. | 280/284 |

Primary Examiner—Joseph F. Peters, Jr.
Assistant Examiner—Michael Mar
Attorney, Agent, or Firm—James D. Givnan, Jr.

[57] ABSTRACT

A wheel suspension device for attachment to the swing arm of a motorcycle with a pair of such devices serving to couple the lower ends of the motorcycle shock absorber units to the motorcycle swing arm. Each device includes a base on which is swingably mounted an upwardly inclined arm member mounting the lower end of the shock absorber unit. A resilient member acts intermediate the base and arm member yieldably supporting suspension loads. At all times the shock absorber to arm member relationship is advantageous to optimum shock absorber function.

6 Claims, 4 Drawing Figures

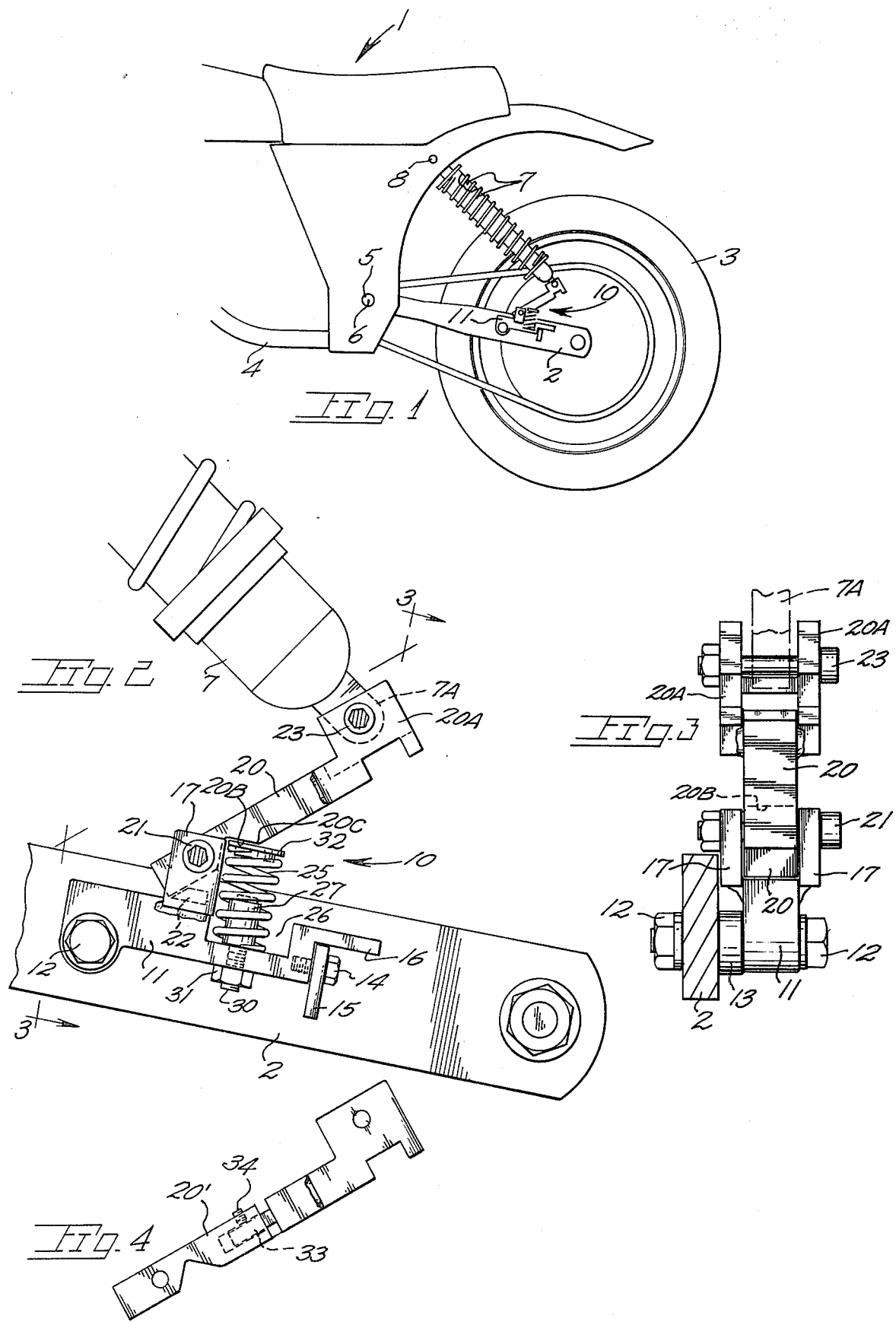

MOTORCYCLE WHEEL SUSPENSION DEVICE

BACKGROUND OF THE INVENTION

The present invention concerns vehicle suspension systems and particularly a device enhancing wheel-to-ground contact of a swing arm mounted wheel subject to severe, fluctuating loads.

In that type of motorcycle used in cross country riding and in motocross events the rear wheel is carried on what is termed a swing arm which moves about a forwardly located horizontal axis at that point of swing arm attachment to the motorcycle frame. Such swing arm mounting permits a wide range of rear wheel travel important to the rapid traversing of the rough terrain encountered at relatively high speeds. Also conventional is the installation of shock absorber units pivotally mounted at their lower rear ends to rearward portions of the yoke shaped swing arm with their upper or forwardly located ends in pivoted attachment to the motorcycle frame. Commonly, such shock absorber units exteriorly include coil springs which, in some cases, are adjustably mounted on the unit to permit pre-loading of the spring to best suit riding conditions.

In motocross competition it is not uncommon for suspension loading to cause the rear wheel to travel several inches relative to the frame and often to be momentarily out of ground contact. Obviously, during such periods no motive power is imparted to the motorcycle and further stability is jeopardized. Accordingly several inventive efforts have been made to control motion of a swing arm carried rear wheel with known efforts being found in the following recent U.S. Pat. Nos. 3,877,539; 3,948,543; 3,966,006; 3,977,697. While swing arm control may be enhanced by such efforts, the devices proposed have not found wide acceptance for one reason or another. The per unit cost of such devices and cost of necessary motorcycle modification bear directly on the adoption by the public of such proposed improvements. Further, some of the proposed improvements incur the disadvantage of substantially increasing vehicle weight and add appendages to the motorcycle which could come into contact with the terrain which, of course, is not only undesirable but may cause a fall with consequent risks to the operator.

SUMMARY OF THE PRESENT INVENTION

The present invention is embodied within a device for location on the swing arm of a vehicle to in turn mount, in an elevated manner, the lower end of a shock absorber unit.

The present device includes a base which may be conveniently attached to the swing arm without costly vehicle alteration. An arm member of the device is swingably carried by said base and normally extends upwardly in an inclined spring biased manner relative to the swing arm terminating at its distal end in a fitting for the reception of the lower end of the shock absorber. Interposed between the base and inclined arm member are resilient means, shown as a helical spring, urging the arm member to its raised position. The shock absorber unit lower end accordingly moves conjointly about the swing arm horizontal axis and about a second horizontal axis common to the arm member-base attachment point.

Important objectives of the present invention include the provision of a wheel suspension device accelerating the rate of downward movement of an associated wheel to reduce ground free skipping of the rear wheel; the provision of a traction enhancing device which may be added to the vehicle without costly modification and which may utilize existing vehicle components; the provision of a device which beneficially alters the shock absorber unit orientation to the swing arm; the provision of a device of uncomplicated structure, highly reliable and accessible for maintenance purposes if needed and which provides a better or softer ride than conventional swing arm suspension arrangements.

BRIEF DESCRIPTION OF THE DRAWINGS

In the accompanying drawing:

FIG. 1 is a side elevational view of a swing arm equipped motorcycle with the present device in place thereon;

FIG. 2 is a side elevational view of the present device in half scale in place on a fragment of the motorcycle swing arm;

FIG. 3 is a front elevational view of the device taken approximately along line 3—3 of FIG. 2; and FIG. 4 is a side elevational view of a modified arm member of the invention.

DETAILED DESCRIPTION OF THE PREFERRED EMBODIMENT

With continuing attention to the drawing, the numeral 1 indicates generally a motorcycle of the type used in cross country and motocross riding typically equipped with a swing arm 2 carrying the motorcycle rear wheel 3. A motorcycle frame 4 supports a swing arm mount 5 having a horizontal axis 6 about which the swing arm and rear wheel 3 move. In continuing similarity to conventional swing arm arrangements, a shock absorber unit 7 is pivotally mounted at its upper end at 8 to the motorcycle frame. The shock absorber unit normally includes a coil spring in addition to the extensible tubular hydraulic shock absorber components, the latter serving to dampen spring action in the well known manner. For purposes of coil spring adjustment, the spring may be adjustably coupled at one end to a shock absorber component.

Indicated generally at 10 is the present suspension device shown in place on swing arm 2 which conventionally is of yoke configuration having a second like suspension device disposed on the unseen portion of the swing arm.

A base 11 of the present device is in securement to swing arm 2 as by means of a bolt and nut assembly 12 with a spacer 13 as shown in FIG. 3. The rearward end of base 11 is shown supported secured by a cap screw 14 carried by a swing arm bracket 15. A rearwardly projecting extension 16 of the base is additionally supported by said bracket. Accordingly base 11 is readily adaptable to most swing arms of various makes and models of motorcycles with but minor effort. Alternatively, base 11 could be formed integral with swing arm 2. Said base is provided with arm mounting plates 17 welded to the base sides and top.

An arm member 20 is swingably mounted at its lower end intermediate plates 17 by means of a shoulder screw and nut assembly 21, the latter preferably including a self-lubricating bushing not shown. To limit movement of arm member 20 upwardly from swing arm 2, a stop 22 is carried by said base. Said arm member is upwardly inclined terminating at its distal end in an enlarged fitting 20A whithin which is received the lower mounting ear 7A of shock absorber 7 through which a fastener assembly 23 extends.

Interposed between arm member 20 and base 11 are resilient means 25 shown as a helical spring, supported at its lower end within a recessed area 26 defined downwardly by a surface of the base and positioned by a locating sleeve 27 in place on an upwardly extending stud 30 secured to the base by means of a lock nut 31. A disc 32 at the spring's upper end includes an annular projection for disc-spring retention purposes. Arm member 20 has a lower seqment configured at 20B to provide a surface opposed to a base surface between which spring 25 is confined. A surface 20C on the arm member moves in wiping contact with disc 32 and may be radiused.

In FIGS. 1 and 2 the motorcycle suspension is shown in an unloaded state wherein rear wheel 3 is located substantially at its lowermost position (lower than with existing suspension systems) relative to motorcycle frame 4. Rider loading of the suspension and the traversing of uneven terrain will cause wheel 3 to upwardly position swing arm 2 loading the shock absorber units 7. Conversely, during periods immediately after a bump or a jump when the rear wheel 3 is out of groung contact, swing arm 2 is repositioned downwardly to the position shown in FIG. 1 for resumption of motive power and vehicle stability. Accordingly, the present device finds advantageous use by motocross competitors in that out of ground contact time is held to a minimum as the present device expedites downward positioning of the wheel. Importantly, shock absorber or dampener unit 7 now acts on swing arm 2 and through a lever embodied in arm 20 to increase shock absorber efficiency with respect to its action on the swing arm since the major axis of arm 20 and the major axis of shock absorber unit 7 more nearly approach the desired perpendicular relationship than is found in the conventional swing arm-to-shock absorber relationship. Less wear and a lower failure rate of shock absorber is accordingly realized.

In one embodiment of the invention for use on a small displacement motorcross motorcycle, helical spring 25 is rated at 550 pounds, i.e., the force required to collapse the spring a distance equal to one-third of its normal length. Normally the shock absorber spring will partially compress prior to initial compression of spring 25 the latter serving to safeguard the suspension system from fully compressing or "bottoming out". Arm member 20 and the leverage contributed thereby provide a significantly greater moment acting downwardly on swing arm 2 than that resulting from conventional shock absorber attachment directly to the swing arm.

In FIG. 4 is a modified arm member at 20' is shown which is extensibly adjustable to vary the arm embodied within said member and in turn vary the action of shock absorber unit 7 on the swing arm. A spline arrangement at 33 and set screw 34 provide for a range of effective overall lengths of arm member 20'.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A wheel suspension device for a motorcycle swing arm to receive the lower end of an extensible motorcycle suspension component, said device comprising, a base, means securing said base to the swing arm, an upwardly and rearwardly inclined arm member pivotally mounted at its lower end to said base, said arm member pivotally attached at its upper end to said suspension component, resilient means on said base and acting on the pivotally mounted end of said arm member urging the latter to a raised position relative to the base whereby the attached motorcycle suspension component is advantageously disposed for repositioning the swing arm and returning the wheel carried thereby into ground contact after momentary separation from the ground, and the pivotally mounted end of said arm member and said base having opposed surfaces against which said resilient means acts.

2. The wheel suspension device claimed in claim 1 wherein said base is adapted for bolted engagement to the swing arm.

3. The wheel suspension device claimed in claim 1 wherein the major axis of said arm member and that of the suspension component define a greater angle than that defined by the projected axes of the swing arm and suspension component whereby loads are imparted to the lower end of said suspension component in an optimum manner.

4. The wheel suspension device claimed in claim 1 wherein said resilient means is a helical spring and said arm member is configured so as to provide the opposed surface thereon substantially perpendicular to the major axis of the spring when said arm member is in a raised position.

5. The wheel suspension device claimed in claim 4 wherein said base is recessed to receive one end of said spring, said spring having a load bearing disc disposed within its arm member orientated end.

6. The wheel suspension device claimed in claim 1 wherein said arm member is axially adjustable to permit varying the distance between the lower end of the motorcycle suspension component and the lower end of said arm member.

* * * * *